United States Patent
Saito

(10) Patent No.: US 10,689,045 B2
(45) Date of Patent: Jun. 23, 2020

(54) SIDE-STAND-EQUIPPED VEHICLE

(71) Applicant: ALPS ALPINE CO., LTD., Ota-ku, Tokyo (JP)

(72) Inventor: Kyozo Saito, Miyagi-Ken (JP)

(73) Assignee: ALPS ALPINE CO., LTD., Tokyo (JP)

(*) Notice: Subject to any disclaimer, the term of this patent is extended or adjusted under 35 U.S.C. 154(b) by 98 days.

(21) Appl. No.: 16/012,006

(22) Filed: Jun. 19, 2018

(65) Prior Publication Data

US 2018/0334209 A1  Nov. 22, 2018

Related U.S. Application Data

(63) Continuation of application No. PCT/JP2016/079971, filed on Oct. 7, 2016.

(30) Foreign Application Priority Data

Dec. 26, 2015 (JP) ................... 2015-255460

(51) Int. Cl.
- *B62H 1/02* (2006.01)
- *B62J 99/00* (2020.01)
- *B62J 45/40* (2020.01)
- *B62J 45/415* (2020.01)
- *G01P 15/18* (2013.01)

(52) U.S. Cl.
CPC ............... B62H 1/02 (2013.01); B62J 99/00 (2013.01); *B62J 45/40* (2020.02); *B62J 45/4151* (2020.02); *B62J 45/4152* (2020.02); *G01P 15/18* (2013.01)

(58) Field of Classification Search
CPC ....... B62H 1/02; B62J 99/00; B62J 2099/002; B62K 2207/04; B62K 2207/02
USPC .......................................................... 280/293
See application file for complete search history.

(56) References Cited

U.S. PATENT DOCUMENTS

| 7,124,852 B2 | 10/2006 | Hasegawa |
| 7,631,885 B2 * | 12/2009 | Safarik ................... B62H 1/02 280/293 |
| 9,097,201 B2 | 8/2015 | Takahasi et al. |
| 9,487,261 B2 | 11/2016 | Tesuka et al. |
| 2013/0270022 A1 * | 10/2013 | Matsuda ................ B62K 11/04 180/220 |
| 2016/0001834 A1 * | 1/2016 | Ramraika ................ B62H 1/02 280/301 |
| 2017/0144665 A1 * | 5/2017 | Ohashi .................. B60W 30/16 |

FOREIGN PATENT DOCUMENTS

EP 2026287 2/2009

OTHER PUBLICATIONS

International Search Report issued in PCT/JP2016/07991, dated Dec. 6, 2016.

* cited by examiner

*Primary Examiner* — Kevin Hurley
*Assistant Examiner* — Felicia L. Brittman
(74) *Attorney, Agent, or Firm* — Hunton Andrews Kurth LLP

(57) ABSTRACT

An acceleration detector is placed on a side stand portion attached to the main body of a side-stand-equipped vehicle. The acceleration detector has a CPU. In a side stand state detection mode, the CPU detects the state of the side stand portion according to a detection signal from the acceleration detector. In an orientation detection mode, the CPU detects the orientation of the main body of the side-stand-equipped vehicle.

6 Claims, 12 Drawing Sheets

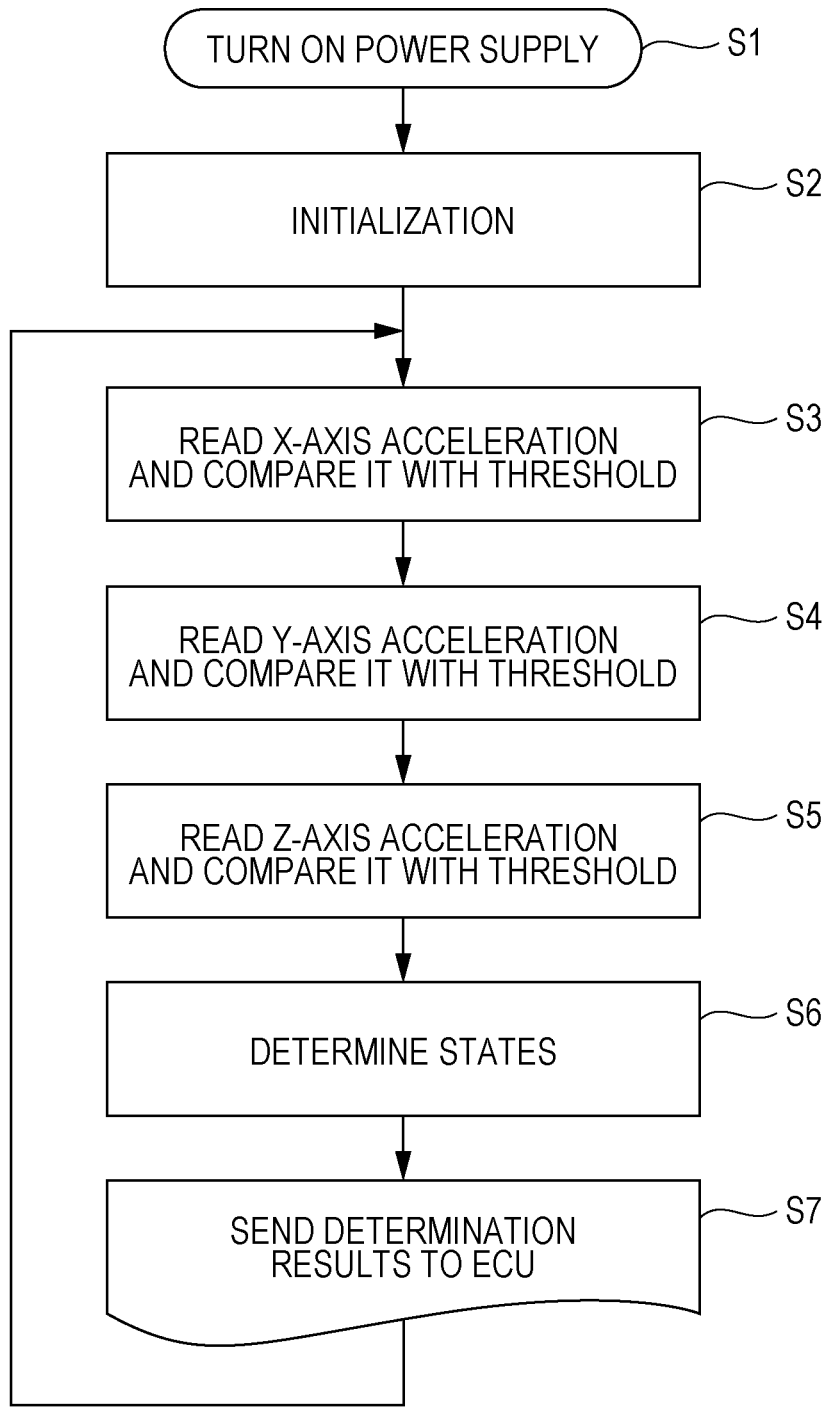

FIG. 7

| X+ | X- | Y+ | Y- | Z+ | Z- | STATE | COMMAND SIGNAL FROM CPU |
|---|---|---|---|---|---|---|---|
| ON | | | | | | NORMAL POSTURE IN SIDE STAND STORED STATE (NORMAL) OR POSTURE INCLINED FORWARD IN SIDE STAND STANDING STATE (ABNORMAL BUT IMPOSSIBLE) | ALLOW ENGINE TO START AND ALSO ALLOW VEHICLE TO START. |
| | ON | | | | | WHEELIE POSTURE IN SIDE STAND STANDING STATE (ABNORMAL) OR UPSET POSTURE IN SIDE STAND STORED STATE (ABNORMAL) | STOP ENGINE. |
| | | ON | | | | FALL TO LEFT IN SIDE STAND STANDING STATE OR FALL TO LEFT IN SIDE STAND STORED STATE | STOP ENGINE. |
| | | | ON | | | FALL TO RIGHT IN SIDE STAND STANDING STATE OR FALL TO RIGHT IN SIDE STAND STORED STATE | STOP ENGINE. |
| | | | | ON | | UPSET POSTURE IN SIDE STAND STANDING STATE (ABNORMAL) OR POSTURE INCLINED FORWARD IN SIDE STAND STORED STATE (ABNORMAL) | STOP ENGINE. |
| | | | | | ON | SIDE STAND STANDING STATE IN NORMAL POSTURE (NORMAL) | ALLOW ENGINE TO START BUT INHIBIT VEHICLE FROM STARTING. |

SIDE-STAND-EQUIPPED VEHICLE

CLAIM OF PRIORITY

This application is a Continuation of International Application No. PCT/JP2016/079971 filed on Oct. 7, 2016, which claims benefit of Japanese Patent Application No. 2015-255460 filed on Dec. 26, 2015. The entire contents of each application noted above are hereby incorporated by reference.

BACKGROUND OF THE INVENTION

1. Field of the Invention

The present invention relates to a vehicle such as a motorcycle, and more particularly to a side-stand-equipped vehicle that has a function to detect the orientation of the side stand portion and a function to detect the orientation of the vehicle.

2. Description of the Related Art

A vehicle has been proposed that has a function to detect the orientation and behavior of a motorcycle, the state of a stand, and the like.

SUMMARY OF THE INVENTION

With the motorcycle disclosed in Japanese Unexamined Patent Application Publication No. 2008-310764, however, a sensor that detects the behavior of the motorcycle such as a fall and a side stand switch that detects the state of the side stand are individually provided. This has led to an increase in the number of parts, increasing the cost of the motorcycle. Another problem is that since a switch is used to detect the state of the side stand, the risk of a malfunction or failure has been high due to a poor contact or the like.

The present invention addresses the above problems with the related art by providing a side-stand-equipped vehicle that uses an acceleration detector attached to the side stand portion to detect both the state of the side stand and the orientation of the vehicle.

A side-stand-equipped vehicle according to the present invention comprises: a pair of wheels; a main body that supports the wheels; an engine portion attached to the main body; a control unit that controls the engine portion; a side stand portion rotatably attached to the main body; an acceleration detector that detects acceleration; and an operation unit that performs a computation on a detection signal from the acceleration detector. The acceleration detector is attached to the side stand portion. The operation unit has a side stand state detection mode in which the state of the side stand portion is detected according to the detection signal and an orientation detection mode in which the orientation of the main body is detected. The control unit controls the operation of the engine portion according to a signal from the operation unit.

In the above structure, a single acceleration detector can detect both the state of the side stand portion and the orientation of the vehicle during a travel, so the number of parts can be reduced.

With the side-stand-equipped vehicle according to the present invention, in the side stand state detection mode, the operation unit preferably determines the state of the side stand portion according to acceleration of gravity applied to the acceleration detector.

In the above structure, since the state of the side stand portion is determined according to acceleration of gravity, a malfunction and a failure are less likely to occur.

With the side-stand-equipped vehicle according to the present invention, the operation unit preferably has a low-pass filter; in the side stand state detection mode, a signal from the acceleration detector is preferably passed through the low-pass filter and is preferably supplied to the operation unit.

In the above structure, it is possible to improve detection precision in the acceleration detector by removing unnecessary noise components such as vibration generated while the vehicle is traveling.

With the side-stand-equipped vehicle according to the present invention, in the orientation detection mode in which the orientation of the main body is detected, the operation unit preferably detects the orientation of the main body according to changes in accelerations in a plurality of directions, the accelerations being applied to the acceleration detector.

In the above structure, it is possible to detect the orientation and operation of the main body in the X, Y, and Z directions by detecting accelerations with the acceleration detector attached to the side stand portion.

With the side-stand-equipped vehicle according to the present invention, the acceleration detector is preferably placed at a position near the main body, the position being on the side stand portion.

In the above structure, since the acceleration detector is placed near the main body of the vehicle, it is possible to minimize vibration-caused effects on the side stand portion and thereby to increase precision in detection of a vehicle orientation.

With the side-stand-equipped vehicle according to the present invention, the acceleration detector is preferably placed in the interior of the side stand portion.

In the above structure, since the acceleration detector is placed in the interior of the side stand portion, the acceleration detector is protected from dirt and flaws while the side-stand-equipped vehicle is traveling.

The present invention can provide a side-stand-equipped vehicle that uses an acceleration detector attached to the side stand portion to detect both the state of the side stand the orientation of the vehicle during a travel.

BRIEF DESCRIPTION OF THE DRAWINGS

FIG. 4 is a flowchart for the acceleration detector attached to the side-stand-equipped vehicle illustrated in FIG. 1;

FIG. 7 is a correlation table that indicates the states of the vehicle and side stand, the states being determined by an ECU from the orientations of acceleration in the side stand states illustrated in FIGS. 5A and 5B and FIGS. 6A and 6B, and also indicates processing performed by the ECU;

DESCRIPTION OF THE PREFERRED EMBODIMENTS

Figure 1:
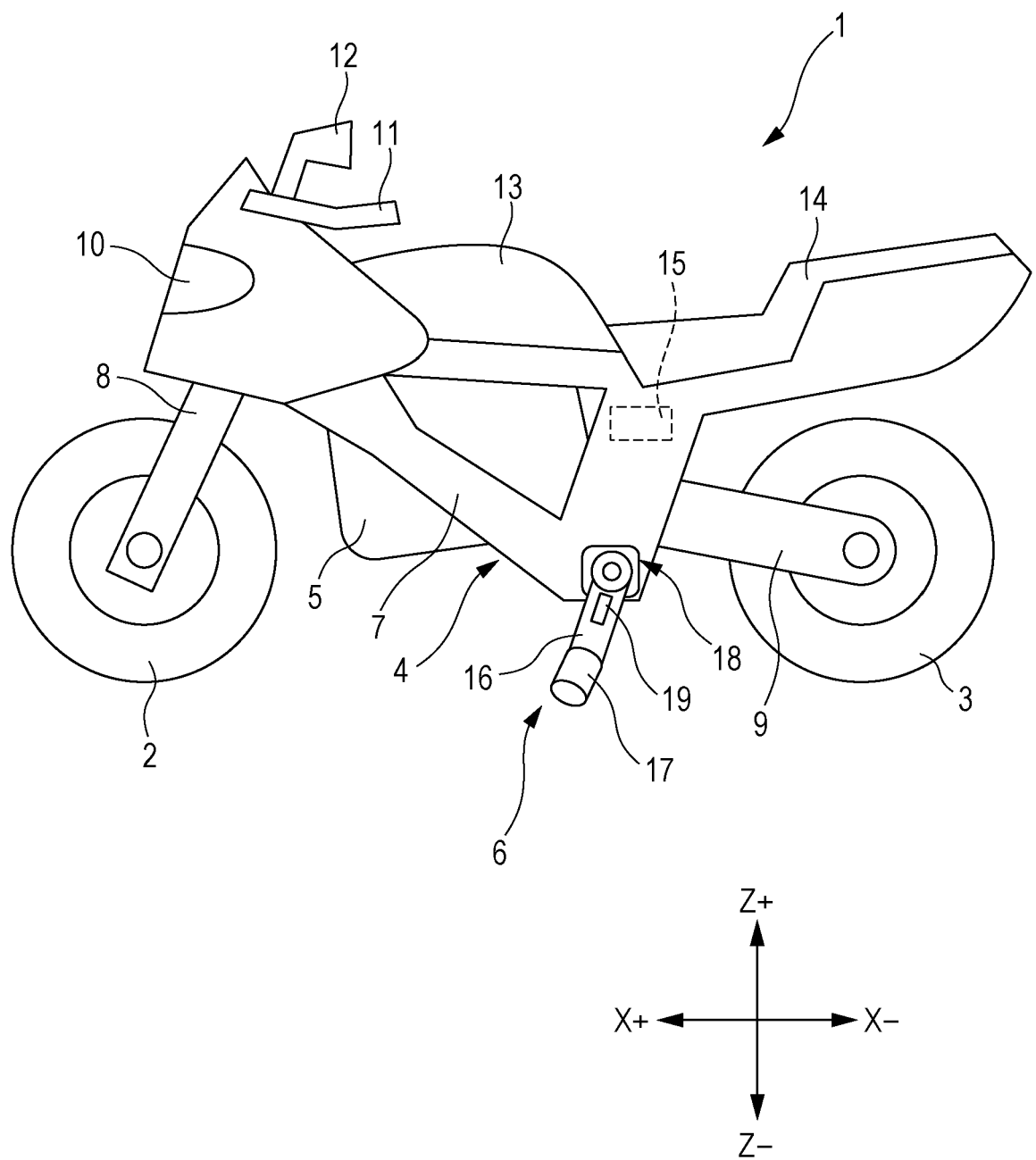
FIG. 1 is a side view illustrating the whole of a side-stand-equipped vehicle according to the present invention.

A specific embodiment of a side-stand-equipped vehicle according to the present invention will be described with reference to the drawings. Dimensions in the drawings are appropriately changed.

As illustrated in FIG. 1, the side-stand-equipped vehicle 1 according to a first embodiment of the present invention has a pair of wheels composed of a front wheel 2 and a rear wheel 3, a main body 4 that supports the front wheel 2 and rear wheel 3, an engine portion 5 attached to the main body 4, and a side stand portion 6 rotatably attached to a side surface of the main body 4, the side surface being near the ground.

The main body 4 will be described below in detail. The main body 4 has a frame 7 formed from steel or aluminum so as to enclose the engine portion 5, a front-wheel suspension mechanism 8 that rotatably supports the front wheel 2 at the front of the frame 7, the front-wheel suspension mechanism 8 being linked to a handle 11 so as to be capable of changing the orientation of the front wheel 2, and a rear-wheel suspension mechanism 9 that rotatably supports the rear wheel 3 at the back of the frame 7. A headlight 10, rear view mirrors 12, a fuel tank 13, and a seat 14 are provided in a range from the forward top of the frame 7 to its back.

An engine control unit (ECU) 15 is provided below the seat 14 of the main body 4. The ECU 15 controls the operations of the electronic devices and engine portion 5 of the side-stand-equipped vehicle 1.

Figure 2:
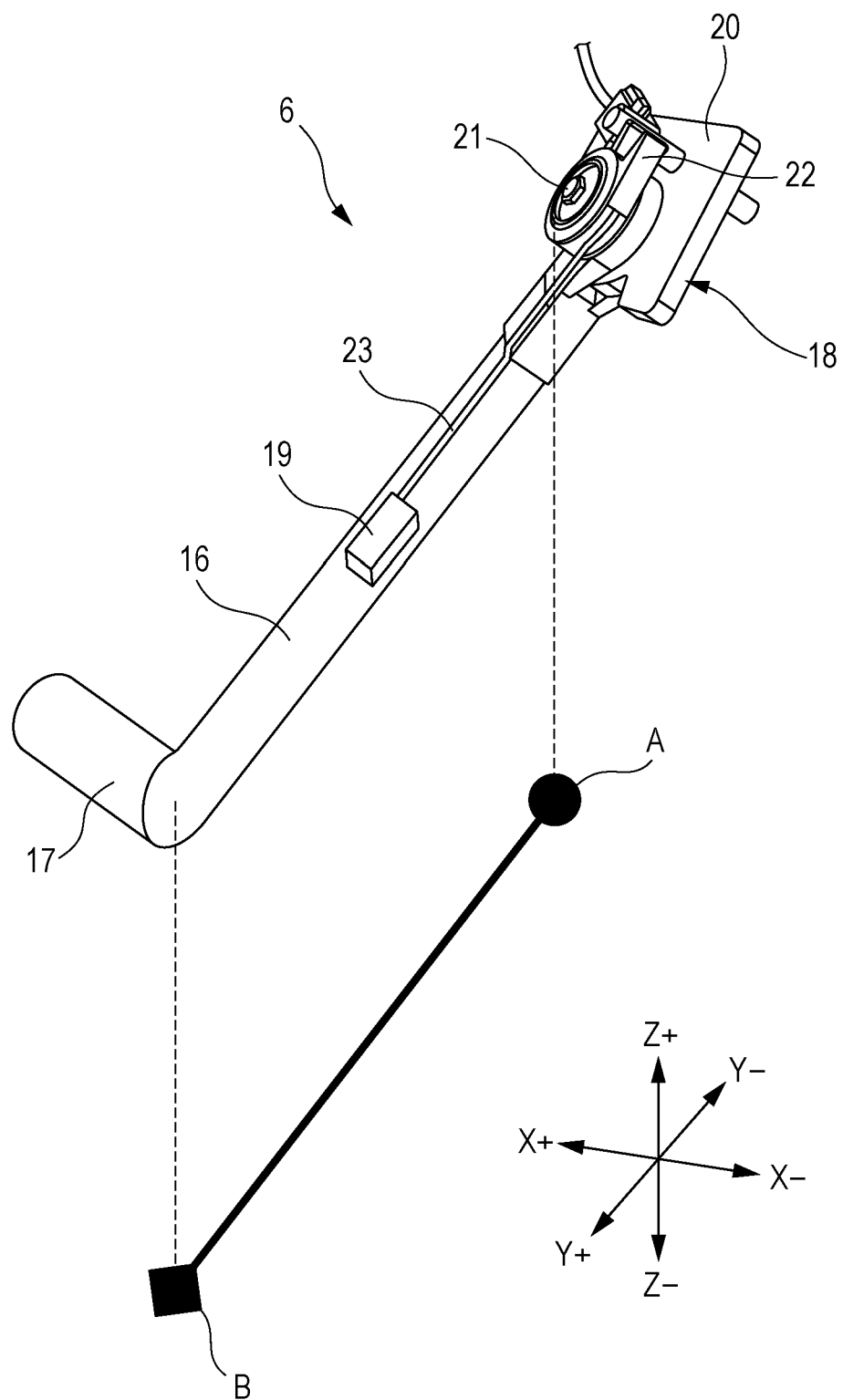
FIG. 2 is a perspective view of a side stand portion of the side-stand-equipped vehicle illustrated in FIG. 1.

The structure of the side stand portion 6 will be described below in detail with reference to FIG. 2. FIG. 2 illustrates a state in which a side stand bar 16 is standing to support the side-stand-equipped vehicle 1 while it is stopping (this state will be referred to below as the side stand standing state). The side stand portion 6 is composed of the side stand bar 16 formed from a metal, a side stand grounding part 17 extending from the lower end of the side stand bar 16 in the Y+ direction, a side stand attaching portion 18 provided on the upper end of the side stand bar 16, and an acceleration detector 19, such as a three-axis acceleration sensor, placed near the center of the side stand bar 16.

The side stand attaching portion 18 has substantially the same mechanical structure as a side stand device disclosed in Japanese Unexamined Patent Application Publication No. 2010-274902 that the applicant of the present invention applied formerly and was released. Specifically, the side stand bar 16 is rotatably attached to a bracket 20 formed from a metal with a fixing bolt 21. The bracket 20 is attached to the lower portion of the frame 7. The rotational center of the side stand bar 16 is covered with a side stand cover 22 formed from a resin. A signal line 23 extends from the acceleration detector 19 along the surface of the side stand bar 16, passes through the inside of the side stand cover 22, and is connected to the ECU 15.

The X axis, Y axis, and Z axis indicated by the arrows in FIG. 2 indicate the initial settings of the three axes of the acceleration detector 19 in the side stand standing state; the X+ direction indicates the advance direction and the X– direction indicates the back direction. The Y axis indicates the right and left sides in the advance direction of the side-stand-equipped vehicle 1; the Y+ direction indicates the left side of in the advance direction of the side-stand-equipped vehicle 1, and the Y– direction indicates the right side. The Z axis indicates the up and down directions of the side-stand-equipped vehicle 1; the Z– direction indicates a direction toward the ground surface, and the Z+ direction indicates a direction away from the ground surface. The direction of acceleration of gravity G matches the Z– direction.

To explain the operations of the side stand portion 6 and acceleration detector 19, FIG. 2 schematically indicates the rotational center of the side stand bar 16 as a black solid A, the rotational center being located on the same side as the bracket 20, and an end of the side stand bar 16 as a black solid square B, the end being located on the same side as the side stand grounding part 17.

Figure 3:
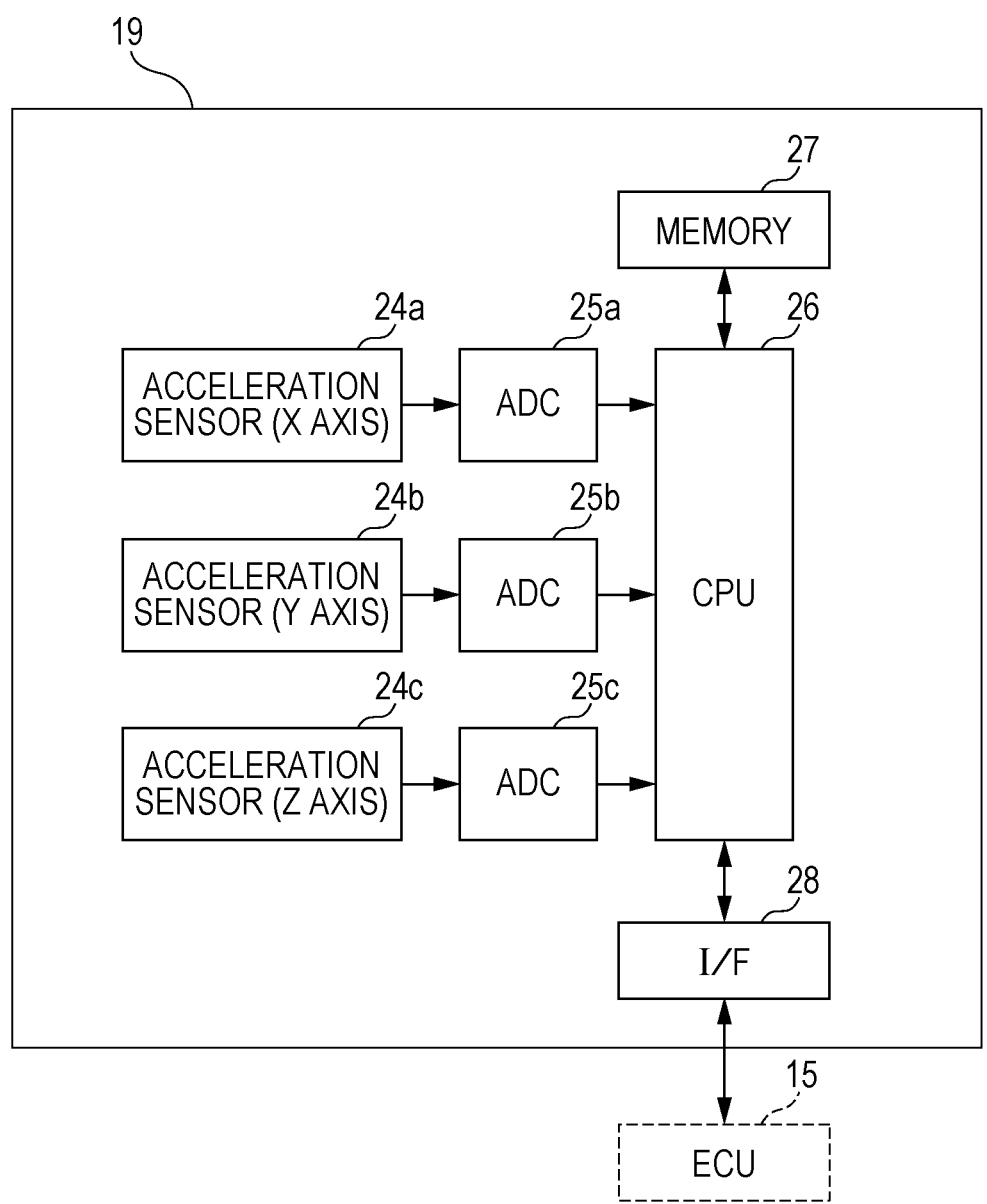
FIG. 3 is a block diagram illustrating the circuit structure of the acceleration detector illustrated in FIG. 1.

Circuits in the acceleration detector 19 will be described with reference to the block diagram in FIG. 3. The acceleration detector 19 has acceleration sensors 24a, 24b, and 24c that detect the accelerations of the three axes (X axis, Y, axis, and Z axis), AD converts 25a, 25b, and 25c that respectively convert signals from the acceleration sensors 24a, 24b, and 24c from analog to digital, a central processing unit (CPU) 26, which is an operation unit that performs computations on signals from the AD converts 25a, 25b, and 25c, and a memory 27 in which operation programs are stored. The acceleration detector 19 is connected to the ECU 15 in the side-stand-equipped vehicle 1 through an interface circuit 28.

Next, the basic computation processing performed by the acceleration detector 19 will be described with reference to the flowchart in FIG. 4. First, when the ignition key of the side-stand-equipped vehicle 1 is turned to turn on the power supply (step S1), the acceleration detector 19 enters a side stand state detection mode and initialization processing is performed according to an initialization program in the memory 27; in the initialization processing, the circuits in the acceleration detector 19 are checked for failures, initialization parameters (for example, thresholds used to make decisions about signals detected by the acceleration sensors 24a, 24b, and 24c) for the AD converts 25a, 25b, and 25c are set, and other processing is performed (step S2).

Next, output signals from the acceleration sensors 24a, 24b, and 24c are read into the CPU 26 and are compared with the thresholds set in step S2 (steps S3 to S5). These thresholds are preset to predetermined value needed for the acceleration sensors 24a, 24b, and 24c in the acceleration detector 19 to make decisions about acceleration of gravity G.

Next, the states of the side-stand-equipped vehicle 1 and side stand portion 6 are determined according to results obtained in comparison with the thresholds in steps S3 to S5 (step S6). This determination processing will be described with reference to FIGS. 5 to 7.

Figure 5A:
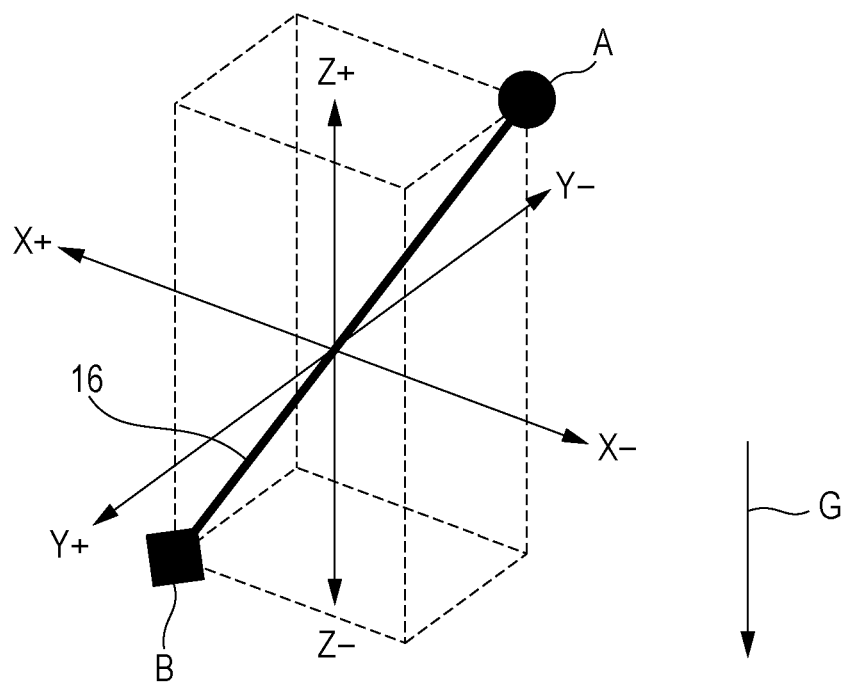
FIGS. 5A and 5B conceptually illustrate, in a state in which the side stand portion of the side-stand-equipped vehicle illustrated in FIG. 1 is standing, the orientations of the side stand portion and acceleration, FIG. 5A illustrating a relationship between the side stand portion and the axes of an acceleration detector with the side stand portion supporting the side-stand-equipped vehicle while the vehicle is parked, FIG. 5B illustrating a relationship between the side stand portion and the axes of the acceleration detector with the side-stand-equipped vehicle falling over.
Figure 5B:
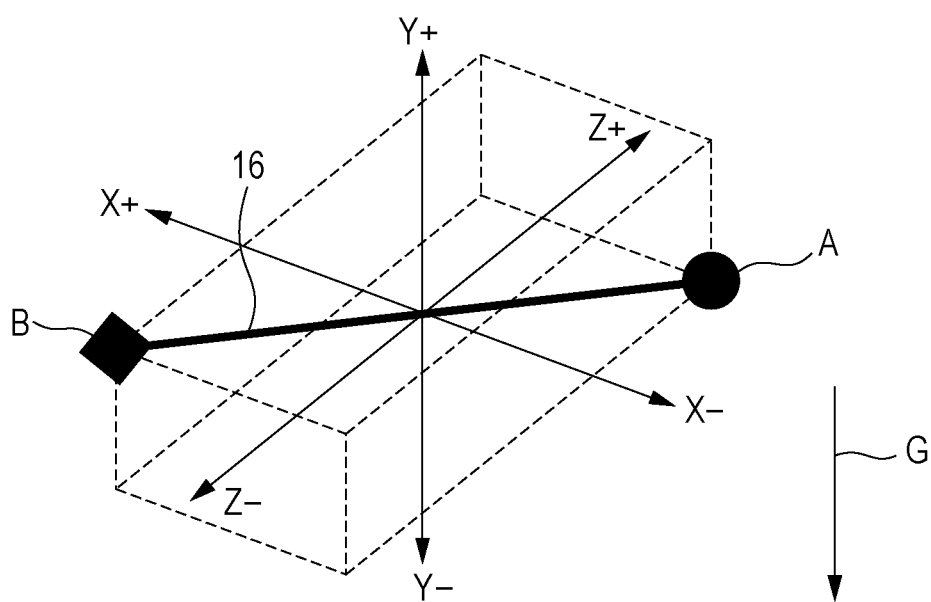

FIGS. 5A and 5B schematically illustrate accelerations that the acceleration sensors 24a, 24b, and 24c receive in the side stand standing state; FIG. 5A illustrates a relationship between the side stand bar 16 and the axes of the acceleration detector 19 with the side stand portion 6 supporting the side-stand-equipped vehicle 1 while it is parked, and FIG. 5B illustrates a relationship between the side stand bar 16 and the axes of the acceleration detector 19 with the side-stand-equipped vehicle 1 falling over.

Figure 6A:
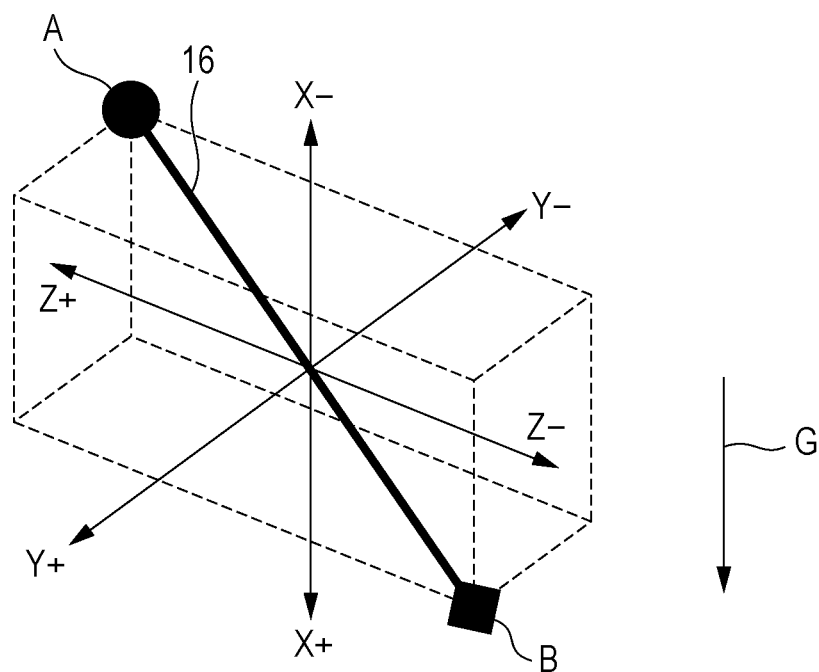
FIGS. 6A and 6B conceptually illustrate, in a state in which the side stand portion of the side-stand-equipped vehicle illustrated in FIG. 1 is stored, the orientations of the side stand portion and acceleration, FIG. 6A illustrating a relationship between the side stand portion and the axes of the acceleration detector while the side-stand-equipped vehicle is traveling straight ahead, FIG. 6B illustrating a relationship between the side stand portion and the axes of the acceleration detector with the side-stand-equipped vehicle falling over.
Figure 6B:
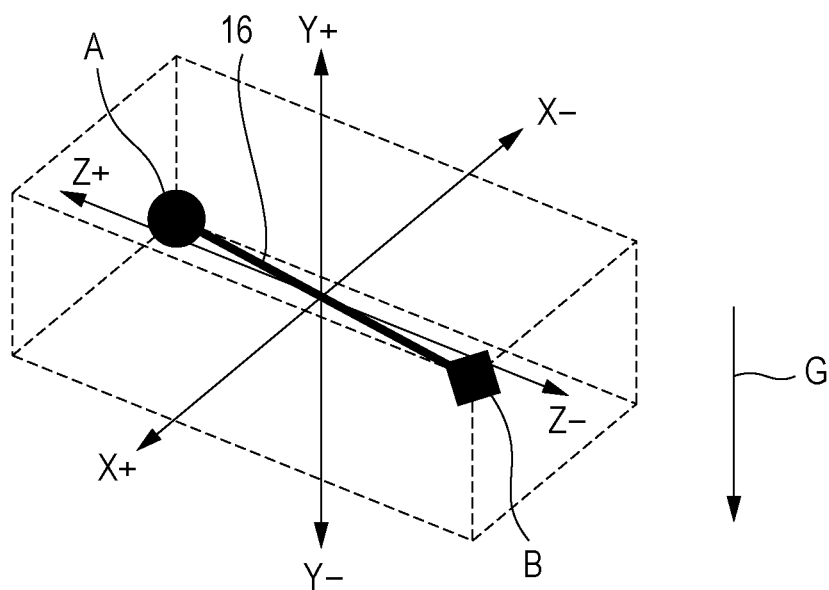

FIGS. 6A and 6B schematically illustrate accelerations that the acceleration sensors 24a, 24b, and 24c receive in a state in which the side stand portion of the side-stand-equipped vehicle 1 is stored; FIG. 6A illustrating a relationship between the side stand bar 16 and the axes of the acceleration detector 19 while the side-stand-equipped vehicle 1 is traveling straight ahead, and FIG. 6B illustrating a relationship between the side stand bar 16 and the axes of the acceleration detector 19 with the side-stand-equipped vehicle 1 falling over.

FIG. 7 is a correlation table that indicates the states of the vehicle and side stand, the states being determined by the ECU 15 from the orientations of acceleration in the side stand states illustrated in FIGS. 5A and 5B and FIGS. 6A and 6B and also indicates processing performed by the ECU 15.

As illustrated in FIG. 5A, while the side-stand-equipped vehicle 1 is supported by the side stand portion 6 because of parking or the like (the side-stand-equipped vehicle 1 is placed in a parking posture), there is acceleration of gravity G neither in the X-axis direction nor in the Y-axis direction. Therefore, output signals, based on acceleration of gravity G, from the acceleration sensors 24a and 24b are 0. However, since the Z-axis direction is parallel to acceleration of gravity G, the Z− direction matches the direction of acceleration of gravity G. Therefore, the acceleration sensor 24c detects acceleration of gravity G in the Z− direction and outputs a detection signal to the CPU 26 through the AD convert 25c.

As illustrated in FIG. 7, when a detection signal, based on acceleration of gravity G, in the Z− direction is generated, the CPU 26 decides that the side-stand-equipped vehicle 1 is in a normal orientation and the side stand portion 6 is in the side stand standing state. The CPU 26 then outputs, to the ECU 15 through the interface circuit 28, a command signal indicating that the start of the engine is possible but the start of the vehicle is not possible.

The ECU 15 allows the start of the engine portion 5 in response to the command signal from the acceleration detector 19. After the engine portion 5 has been started, if an attempt is made to start the side-stand-equipped vehicle 1 with the side stand portion 6 standing, the ECU 15 forcibly stops the operation of the engine portion 5.

Next, processing performed when the side-stand-equipped vehicle 1 falls over to the right with the side stand portion 6 in the side stand standing state will be described with reference to FIG. 5B. If the side-stand-equipped vehicle 1 falls over to the right due to some kind of accident with the side stand portion 6 in the side stand standing state as illustrated in FIG. 5B, the Z+ direction is rotated around the X axis from the state in FIG. 5A so as to become the Y− direction. That is, in FIG. 5B, since the Y− direction matches the direction of acceleration of gravity G, the acceleration of gravity G applied to the acceleration detector 19 is exerted in the Y− direction. Therefore, the acceleration sensor 24b detects acceleration of gravity G in the Y− direction and outputs a detection signal to the CPU 26 through the AD convert 25b.

Upon the reception of the detection signal, based on acceleration of gravity G, in the Y− direction, the CPU 26 decides that the side stand portion 6 is in the side stand standing state and the side-stand-equipped vehicle 1 falls over. The CPU 26 then sends a command signal to stop the engine to the ECU 15 through the interface circuit 28, as illustrated in FIG. 7.

The ECU 15 stops the engine portion 5 in response to the command signal from the acceleration detector 19.

If the side-stand-equipped vehicle 1 falls over to the left with the side stand portion 6 in the side stand standing state, the acceleration sensor 24b detects acceleration of gravity G in the Y+ direction and sends a command signal to stop the engine to the ECU 15 as in falling to the right.

After that, the acceleration detector 19 shifts to an orientation detection mode in which the orientation of the side-stand-equipped vehicle 1 is detected, and sends acceleration information about the X axis, Y axis, and Z axis to the ECU 15 in real time. Then, the ECU 15 performs processing for various mechanisms of the side-stand-equipped vehicle 1 (such as output processing for the engine portion 5 and adjustment of attenuation force in the front-wheel suspension mechanism 8 and rear-wheel suspension mechanism 9).

Next, processing in the side stand state detection mode will be described. This processing is executed when the ignition key of the side-stand-equipped vehicle 1 is turned to turn on the power supply in a state in which the side stand bar 16 of the side-stand-equipped vehicle 1 is swung toward the main body 4 (side stand stored state).

As illustrated in FIG. 6A, when the side-stand-equipped vehicle 1 is to be traveled, the side stand bar 16 of the side stand portion 6 is in a state in which the side stand bar 16 is swung toward the main body 4 around the fixing bolt 21 and is fixed (side stand stored state). That is, the side stand bar 16 is in a state in which the side stand bar 16 is swung around the Y axis from the state in FIG. 5A (that is, the parking posture) so that the Z+ direction is oriented in the X+ direction (in this state, the side-stand-equipped vehicle 1 is in a travel posture). At that time, acceleration of gravity G is exerted neither in the Y-axis direction of the acceleration detector 19 nor in its Z-axis direction. Therefore, output signals, based on acceleration of gravity G, from the acceleration sensors 24b and 24c are 0. However, the X+ direction of the acceleration detector 19 matches the direction of acceleration of gravity G. Therefore, the acceleration sensor 24a detects acceleration of gravity G in the X+ direction and outputs a detection signal to the CPU 26 through the AD convert 25a.

Upon the reception of the detection signal, based on acceleration of gravity G, in the X+ direction, the CPU 26 decides that the side-stand-equipped vehicle 1 is in a normal orientation and the side stand portion 6 is in the side stand standing state. The CPU 26 then outputs, to the ECU 15 through the interface circuit 28, a command signal that allows the engine to start and also allows the vehicle to start, as illustrated in FIG. 7.

In response to the command signal from the acceleration detector 19, the ECU 15 allows the start of the engine and also allows the rider to travel.

Next, processing performed when the side-stand-equipped vehicle 1 falls over to the right with the side stand portion 6 in the side stand stored state will be described with reference to FIG. 6B. If the side-stand-equipped vehicle 1 falls over to the right with the side stand portion 6 in the side stand stored state, the axes of the acceleration detector 19 are rotated around the Z axis from the state in FIG. 6A (travel posture) so that the Y+ direction is oriented in the X− direction. At that time, acceleration of gravity G is exerted neither in the X-axis direction of the acceleration detector 19 nor in its Z-axis direction. Therefore, output signals, based on acceleration of gravity G, from the acceleration sensors 24*a* and 24*c* are 0. However, the Y− direction of the acceleration detector 19 matches the direction of acceleration of gravity G. Therefore, the acceleration sensor 24*b* detects acceleration of gravity G in the Y− direction and outputs a detection signal to the CPU 26 through the AD convert 25*b*.

Upon the reception of the detection signal, based on acceleration of gravity G, in the Y− direction, the CPU 26 decides that the side-stand-equipped vehicle 1 is in the falling state and the side stand portion 6 is in the side stand stored state. The CPU 26 then sends a command signal to stop the engine to the ECU 15 through the interface circuit 28, as illustrated in FIG. 7.

The ECU 15 stops signals from being supplied to an electric system in the engine portion 5 and also stops fuel from being supplied to the engine portion 5, in response to the command signal from the acceleration detector 19.

If the side-stand-equipped vehicle 1 falls over to the left while in the side stand stored state, contrary to the fall to the right described above, the acceleration sensor 24*b* of the acceleration detector 19 detects acceleration of gravity G in the Y+ direction, after which the acceleration detector 19 sends a command signal to stop the engine to the ECU 15 as in the fall to the right.

After the above processing has been performed, the acceleration detector 19 shifts to the orientation detection mode, in which the acceleration detector 19 detects acceleration information about the X axis, Y axis, and Z axis of the main body 4 with the acceleration sensors 24*a*, 24*b*, and 24*c*, the acceleration being caused by the behavior of the side-stand-equipped vehicle 1, and sends the acceleration information to the ECU 15. According to the acceleration information, the ECU 15 appropriately controls functions of the side-stand-equipped vehicle 1 (such as outputs to the front-wheel suspension mechanisms 8 and 9, brake, and engine portion 5 and orientation of the headlight 10).

Figure 8A:
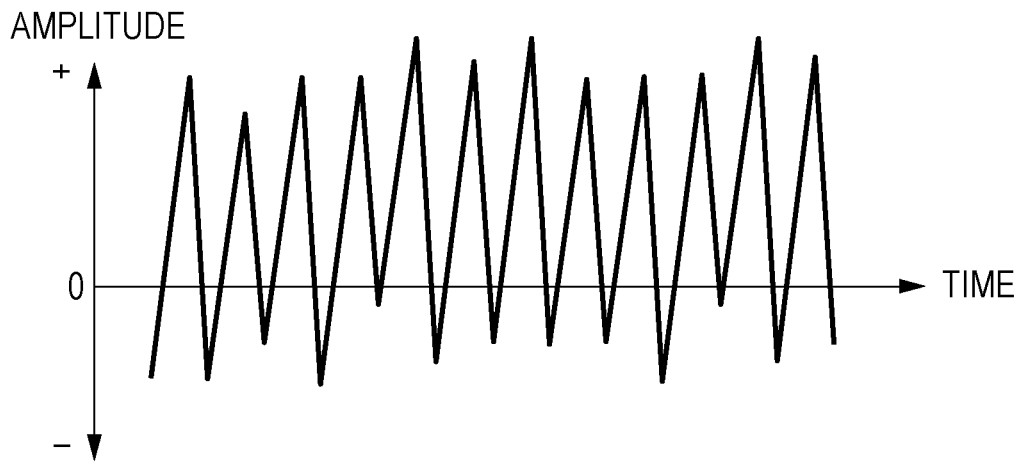
FIG. 8A is a graph illustrating an output signal from an acceleration sensor.
Figure 8B:
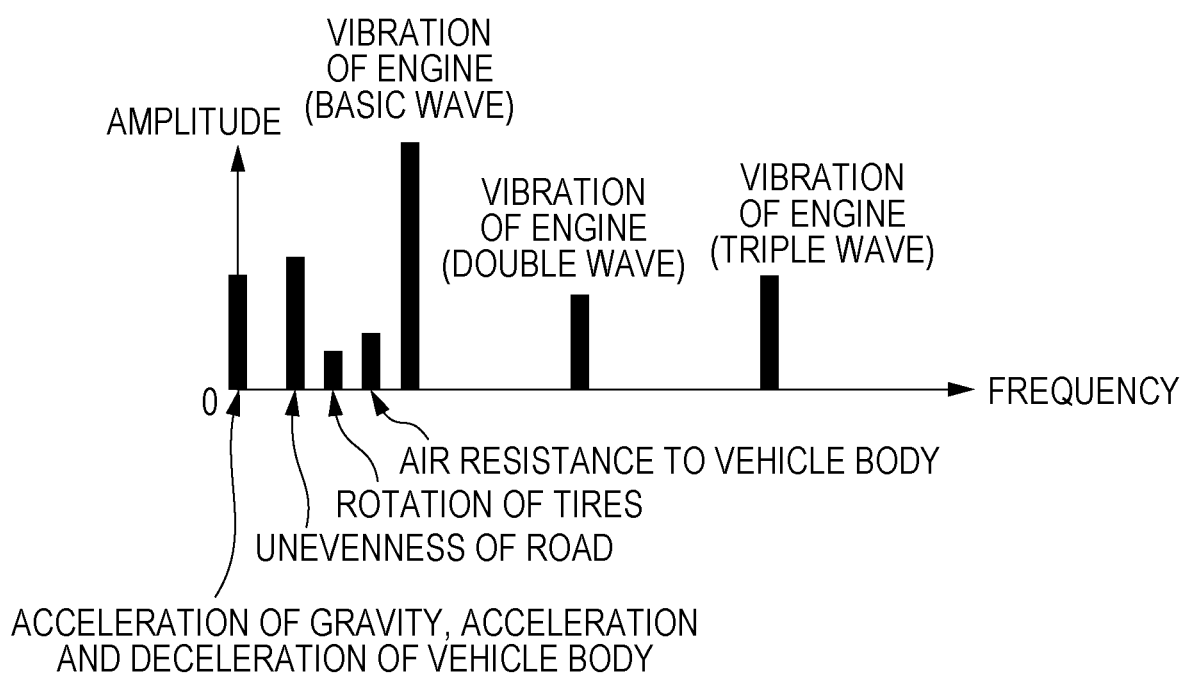
FIG. 8B is a graph in which signals included in the output signal from the acceleration sensor are classified according to their frequency components.

Output signals from the acceleration sensors 24*a*, 24*b*, and 24*c* include many alternating-current noise components due to unevenness of the road, rotation of tires, air resistance to the vehicle body, vibration of the engine portion 5, and the like, as illustrated in FIG. 8A. However, signals, based on acceleration of gravity G, to be retrieved from the acceleration sensors 24*a*, 24*b*, and 24*c* to detect the state of the side stand portion 6 are direct-current signals having no frequency component (their frequencies are 0), as illustrated in FIG. 8B. Therefore, when a low-pass filter circuit 29 is provided behind the acceleration sensors 24*a*, 24*b*, and 24*c* as illustrated in, for example, FIG. 9, the alternating-current noise components can be removed from the output signals from the acceleration sensors 24*a*, 24*b*, and 24*c*.

Figure 9:
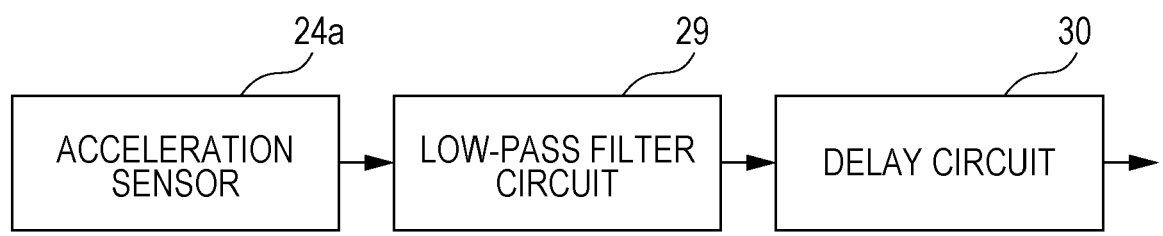
FIG. 9 is a block diagram illustrating a variation of a circuit in the acceleration detector.

Each direct-current noise component (its frequency is 0) also includes a direct-current component caused by acceleration and deceleration of the side-stand-equipped vehicle 1, as illustrated in FIG. 8B. Therefore, when a delay circuit 30 is provided behind the low-pass filter circuit 29 as illustrated in FIG. 9, the direct-current component caused by acceleration and deceleration can also be removed.

Figure 10:
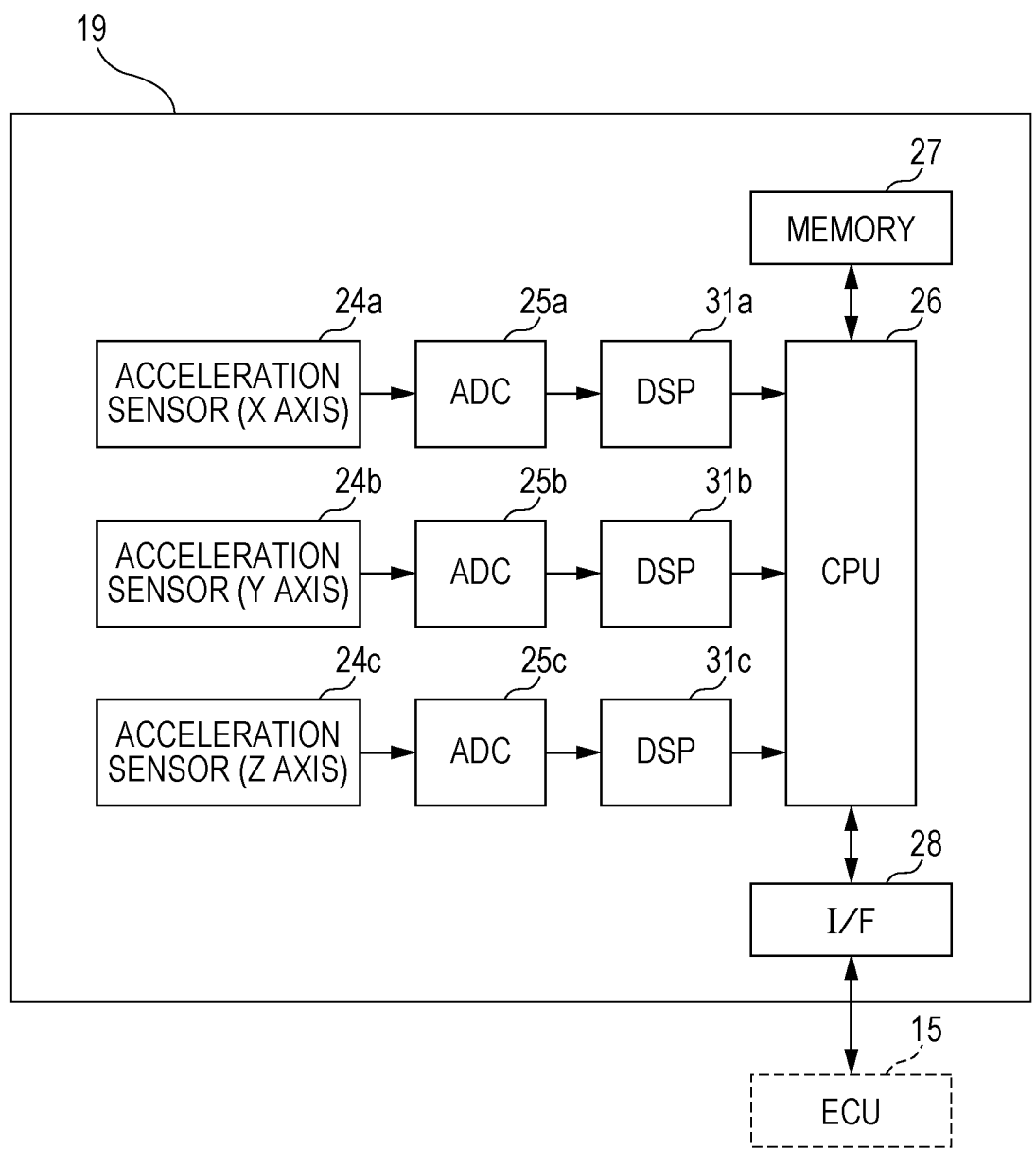
FIG. 10 is a block diagram illustrating another variation of the circuit in the acceleration detector.

In a variation effective to retrieve signal components of acceleration of gravity G by computation to reduce the load of the CPU 26, digital signal processors (DSPs) 31*a*, 31*b*, and 31*c* are respectively provided between the CPU 26 and the AD converts 25*a*, 25*b*, and 25*c* as illustrated in FIG. 10.

Figure 11:
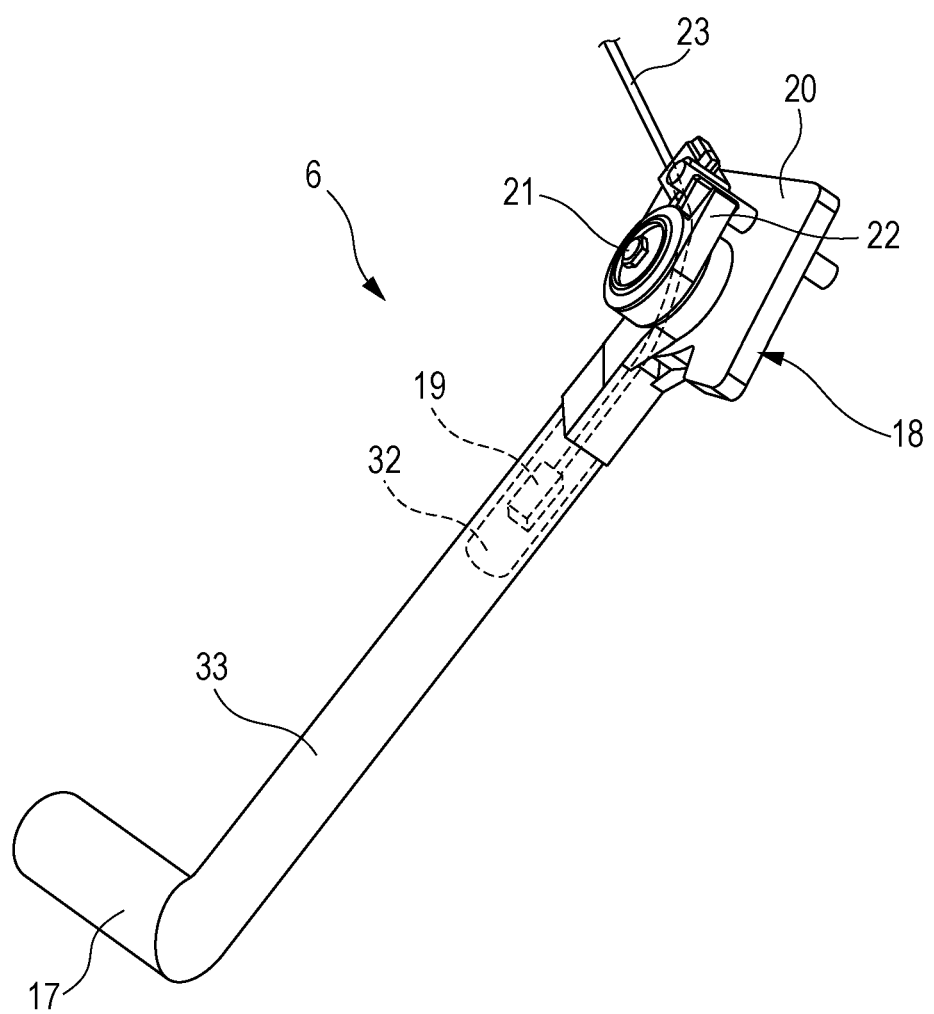
FIG. 11 is a perspective view of the side stand portion when the acceleration detector is placed in the interior of the side stand portion.

Next, a first variation to attach the acceleration detector 19 is illustrated in FIG. 11. The side stand portion 6 in this variation has a side stand bar 33 in which a hollow 32 is formed in an interior on the same side as the side stand attaching portion 18. The acceleration detector 19 is placed in the hollow 32. The signal line 23 passes through the inside of the side stand cover 22 from the hollow 32, and is connected to the ECU 15.

The bottom of the side-stand-equipped vehicle 1 is very likely to be damaged and dirtied by pebbles and rainwater splashed up by the tires during traveling. However, when the acceleration detector 19 is placed in the hollow 32 in the side stand bar 33, the acceleration detector 19 is protected from dirt and flaws, resulting in a structure that does not fail easily. Since the acceleration detector 19 is placed close to the fixing bolt 21, around which the side stand bar 33 is rotated, it is possible to more accurately detect the behavior of the side-stand-equipped vehicle 1.

Figure 12:
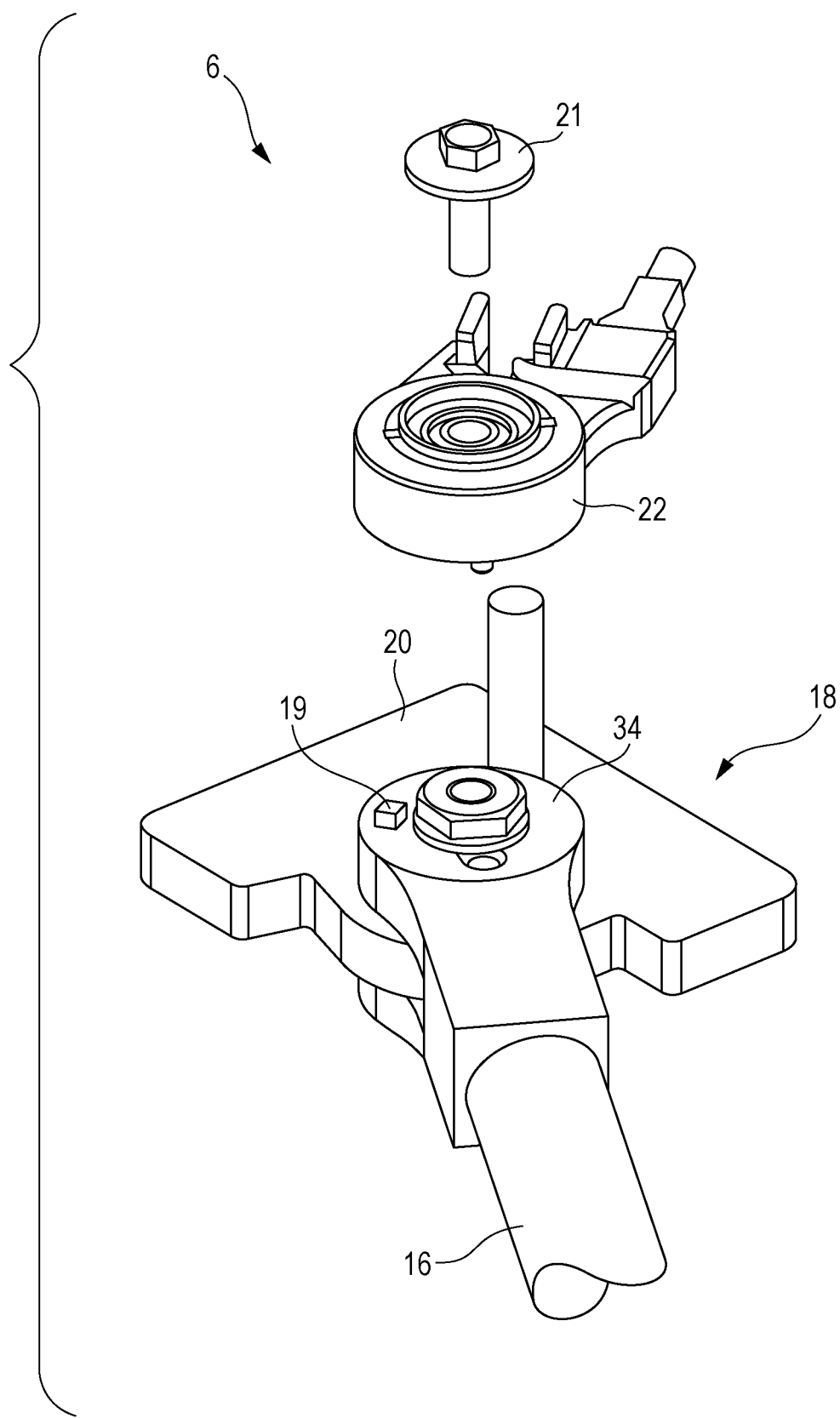
FIG. 12 is an exploded perspective view of the side stand portion when the acceleration detector is attached to the rotation support of the side stand portion.

Next, a second variation to attach the acceleration detector 19 is illustrated in FIG. 12. In this variation, the acceleration detector 19 is placed on a coupler 34 of the side stand bar 16, and the side stand cover 22 covers the top of the coupler 34.

In this structure as well, the side stand bar 16 protects the acceleration detector 19 from dirt and flaws as in the first variation, making the structure less likely to fail. Since the acceleration detector 19 is placed closer to the main body 4 of the side-stand-equipped vehicle 1 than in the first variation, it is possible to more accurately detect the behavior of the side-stand-equipped vehicle 1.

Although the present invention has been described by using a side-stand-equipped vehicle having two wheels (front wheel 2 and rear wheel 3), the vehicle may have more wheels (for example, the vehicle may have two front wheels and one rear wheel).

Although, in this embodiment, the acceleration detector 19 has shifted from the side stand state detection mode to the orientation detection mode in which the orientation of the side-stand-equipped vehicle 1 is detected, a switchover may be made at fixed time intervals between the side stand state detection mode and the orientation detection mode. Alternatively, the two modes may be used in concurrent processing.

Although, in this embodiment, the acceleration detector 19 has performed computation processing for the state of the side stand portion 6, the acceleration detector 19 may send acceleration signals in the X-axis, Y-axis, and Z-axis directions to the ECU 15 and the ECU 15 may perform computation processing to detect the side stand state.

Although, in this embodiment, three acceleration sensors have been used to detect X-axis, Y-axis, and Z-axis accelerations, a single acceleration sensor that can detect accelerations of the three axes may be used.

The present invention is not limited to the above embodiment. The present invention can be appropriately modified without departing from the intended scope of the present invention.

What is claimed is:

1. A side-stand-equipped vehicle comprising:
   a pair of wheels;
   a main body that supports the pair of wheels;
   an engine portion attached to the main body;
   a control unit that controls the engine portion;
   a side stand portion rotatably attached to the main body;
   an acceleration detector that detects acceleration; and
   an operation unit that performs a computation on a detection signal from the acceleration detector; wherein
   the acceleration detector is attached to the side stand portion,
   the operation unit has a side stand state detection mode in which a state of the side stand portion is detected according to the detection signal and an orientation detection mode in which an orientation of the main body is detected,
   the control unit controls an operation of the engine portion according to a signal from the operation unit, and
   in the side stand state detection mode, the operation unit determines the state of the side stand portion according to acceleration of gravity applied to the acceleration detector.

2. The side-stand-equipped vehicle according to claim 1, wherein:
   the operation unit has a low-pass filter; and
   in the side stand state detection mode, a signal from the acceleration detector is passed through the low-pass filter and is supplied to the operation unit.

3. The side-stand-equipped vehicle according to claim 2, wherein in the orientation detection mode in which the orientation of the main body is detected, the operation unit detects the orientation of the main body according to a change in accelerations in a plurality of directions, the accelerations being applied to the acceleration detector.

4. The side-stand-equipped vehicle according to claim 1, wherein in the orientation detection mode in which the orientation of the main body is detected, the operation unit detects the orientation of the main body according to a change in accelerations in a plurality of directions, the accelerations being applied to the acceleration detector.

5. The side-stand-equipped vehicle according to claim 1, wherein the acceleration detector is placed at a position near the main body, the position being on the side stand portion.

6. The side-stand-equipped vehicle according to claim 1, wherein the acceleration detector is placed in an interior of the side stand portion.

* * * * *